(12) United States Patent
Winkelnkemper et al.

(10) Patent No.: US 8,687,397 B2
(45) Date of Patent: Apr. 1, 2014

(54) METHOD FOR OPERATING A DIRECT CONVERTER CIRCUIT AND DEVICE TO CARRY OUT THE METHOD

(75) Inventors: Manfred Winkelnkemper, Ennetbaden (CH); Arthur Korn, Baden (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 13/526,048

(22) Filed: Jun. 18, 2012

(65) Prior Publication Data
US 2012/0249113 A1    Oct. 4, 2012

Related U.S. Application Data

(63) Continuation of application No. PCT/EP2010/069277, filed on Dec. 9, 2010.

(30) Foreign Application Priority Data

Dec. 17, 2009  (EP) .................................... 09179643

(51) Int. Cl.
*H02M 5/00* (2006.01)

(52) U.S. Cl.
USPC ........................... 363/148; 363/157; 363/159

(58) Field of Classification Search
USPC ........... 363/34, 148, 157, 159, 163, 164, 165
See application file for complete search history.

(56) References Cited

U.S. PATENT DOCUMENTS

| 6,856,038 | B2 * | 2/2005 | Rebsdorf et al. ................. 290/44 |
| 6,900,998 | B2 | 5/2005 | Erickson et al. | |
| 7,436,147 | B2 * | 10/2008 | Sato et al. ..................... 318/800 |
| 2004/0022081 | A1 * | 2/2004 | Erickson et al. ............... 363/159 |
| 2004/0027843 | A1 * | 2/2004 | Mahlein et al. ............... 363/159 |
| 2010/0020577 | A1 | 1/2010 | Dommaschk et al. | |

FOREIGN PATENT DOCUMENTS

| WO | WO 2007/023064 A1 | 3/2007 |
| WO | WO 2008/067788 A1 | 6/2008 |

OTHER PUBLICATIONS

"A Novel DC-Link Voltage Control of PWM-Switched Cascade Cell Multi-level Inverter Applied to STATCOM" IEEE, Oct. 2-6, 2005.*

(Continued)

*Primary Examiner* — Timothy J Dole
*Assistant Examiner* — Ivan Laboy Andino
(74) *Attorney, Agent, or Firm* — Buchanan Ingersoll & Rooney PC (57) ABSTRACT

A method and device for operating a direct converter circuit are provided. A control signal controls power semiconductor switches of switching cells of the associated phase module. The control signal is formed, for each phase module, from the difference between a reference signal relating to the voltage over the phase module and a voltage signal over the inductor. The voltage signal over the inductor is formed from a reference signal relating to the current through the corresponding phase module. The reference signal relating to the current through the phase module is formed from a respective mean value or instantaneous value of a phase power of a phase of the first and second current or voltage systems connected to the phase module and from respective sums of the instantaneous values or the mean values of the phase powers of the phases of the first and second current or voltage systems, respectively.

12 Claims, 2 Drawing Sheets

Legend:
2 - Switching Cells
3 - Control Circuit
4 - First Calculation Unit
5 - Second Calculation Unit
6 - Third Calculation Unit (56) References Cited

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA/237) dated Jul. 12, 2012, issued in corresponding International Application No. PCT/EP2010/069277. (8 pages).

International Search Report (PCT/ISA/210) issued on Apr. 19, 2011, by the European Patent Office as the International Searching Authority for International Application No. PCT/EP2010/069277.
European Search Report (EPA Form 1507N) issued on Jun. 28, 2010.
Colin Oates, "A methodology for developing 'chainlink' converters", Power Electronics and Applications, Sep. 8, 2009, pp. 1-10.
Antonios Antonopoulos et al., "On dynamics and voltage control of the Modular Multilevel Converter", power Electronics and Applications, Sep. 8, 2009, pp. 1-10.

\* cited by examiner

METHOD FOR OPERATING A DIRECT CONVERTER CIRCUIT AND DEVICE TO CARRY OUT THE METHOD

RELATED APPLICATION(S)

This application claims priority as a continuation application under 35 U.S.C. §120 to PCT/EP2010/069277, which was filed as an International Application on Dec. 9, 2010 designating the U.S., and which claims priority to European Application 09179643.3 filed in Europe on Dec. 17, 2009. The entire contents of these applications are hereby incorporated by reference in their entireties.

FIELD

The present disclosure relates to the field of power electronics. More particularly, the present disclosure relates to a method for operating a direct converter circuit, and to a device to carry out the method.

BACKGROUND INFORMATION

In the past, direct converter circuits, such as matrix converters, tended to be of academic importance. Today, however, direct converter circuits are gaining in importance, particularly for industrial applications, because an input voltage or an input current of a first amplitude and a first frequency can be converted directly into an output voltage or into an output current of a second amplitude and a second frequency by means of a direct converter circuit with no expensive intermediate direct voltage circuit or intermediate direct current circuit. A direct converter circuit of this type is disclosed, for example, in U.S. Pat. No. 6,900,998 B2. Here, the direct converter circuit has n=3 input phase connections and p=3 output phase connections, i.e. the direct converter circuit from U.S. Pat. No. 6,900,998 B2 has a three-phase design on the input side and on the output side. The direct converter circuit from U.S. Pat. No. 6,900,998 B2 furthermore includes nine phase modules, each with a two-pole switching cell to switch a positive and a negative voltage between the poles, wherein each output phase connection is connected in series with each input phase connection in each case directly via a switching cell. A switching cell of this type has controllable two-way power semiconductor switches with a controlled one-way current-carrying direction and a capacitive energy store.

A drawback with a direct converter circuit according to U.S. Pat. No. 6,900,998 B2 is that the voltage on each branch, i.e. on each phase module, cannot be set in such a way that a continuous current flow can be achieved by the switching cells, as a result of which no active current setting by the respective branch is possible. As a result, only a very restricted or no exchange of electrical energy between individual branches is possible with the direct converter circuit from U.S. Pat. No. 6,900,998 B2. However, if the direct converter circuit is intended to be capable of transferring a large amount of electrical energy, the capacitors of the switching cells from U.S. Pat. No. 6,900,998 B2 must be dimensioned as correspondingly large, resulting in an enormous space requirement of a direct converter circuit of this type and considerable costs. As a result, systems set up with direct converter circuits of this type will similarly have correspondingly substantial space requirements and will be correspondingly expensive.

Energy fluctuations in the individual phase modules result in voltage fluctuations in the capacitive energy stores in the associated switching cells. However, for a reliable and stable operation, and in order to enable a low-cost implementation of the direct converter circuit, it must be possible to limit and minimize the amplitude of this energy fluctuation on the phase module in order to be able to limit the maximum voltage on each individual capacitive energy store of the associated switching cell of the phase module to a required value with the smallest possible capacitive energy store.

In "A Methodology for Developing 'Chainlink' Converters", EPE 8 Sep. 2009, a direct converter circuit is disclosed in which each phase module has an inductor in series with the series circuit of the switching cells.

In WO 2008/067788 A1, a method is disclosed for the operation of a converter circuit according to WO 2007/023064 A1, which regulates the energy content of the switching cells. The method described in WO 2008/067788 A1 applies only to designs of the converter circuit according to WO 2007/023064 A1 which connect three phases of one system to two phases of another system, wherein the currents in the connection terminals of the direct converter circuits are always zero.

In "On Dynamics and Voltage Control of the Modular Multilevel Converter", EPE 8 Sep. 2009, a method is disclosed for the operation of a converter circuit, in which the balancing of the phase modules is effected with the aid of a control provided specifically for that purpose.

SUMMARY

An exemplary embodiment of the present disclosure provides a method for operating a direct converter circuit. The direct converter circuit includes at least two phase modules and is configured to connect phases of a first current system or voltage system with phases of a second current system or voltage system. Each phase module respectively includes a plurality of two-pole switching cells connected in series with one another. Each phase module includes an inductor respectively in series with the series circuit of the corresponding switching cells, and each switching cell having controllable two-way power semiconductor switches with a controlled one-way current-carrying direction and a capacitive energy store. The exemplary method includes controlling the power semiconductor switches of the switching cells of the associated phase module by means of a control signal. For each phase module, the exemplary method includes forming the control signal from the difference between a reference signal in relation to a voltage over the phase module and a voltage signal over the inductor, respectively. The exemplary method includes forming the voltage signal over the inductor from a reference signal in relation to the current through the corresponding phase module, respectively. In addition, the exemplary method includes forming the reference signal in relation to the current through the corresponding phase module from a mean value or instantaneous value of a phase power of a phase of the first current system or voltage system connected to the phase module, from a mean value or instantaneous value of a phase power of a phase of the second current system or voltage system connected to the corresponding phase module, from the sum of the instantaneous values or of the mean values of the phase powers of the phases of the first current system or voltage system, and from the sum of the instantaneous values or of the mean values of the phase powers of the phases of the second current system or voltage system, respectively.

An exemplary embodiment of the present disclosure provides a device for operating a direct converter circuit. The direct converter circuit includes at least two phase modules and is configured to connect phases of a first current system or voltage system with phases of a second current system or voltage system. Each phase module respectively includes a plurality of two-pole switching cells connected in series with one another. Each phase module respectively includes an inductor in series with the series circuit of the switching cells. Each switching cell includes controllable two-way power semiconductor switches with a controlled one-way current-carrying direction and a capacitive energy store. The exemplary device includes a control circuit for each phase module configured to generate a control signal. The control circuit is connected to the power semiconductor switches of the switching cells of the corresponding phase module, respectively. In relation to each phase module, the difference between a reference signal in relation to the voltage over the corresponding phase module and a voltage signal over the inductor is fed to the control circuit to form the control signal, respectively. The exemplary device also includes, for all phase modules, a common first calculation unit configured to form the voltage signal over the inductor from a reference signal in relation to the current through the corresponding phase module, respectively. In addition, the exemplary device includes, for all phase modules, a common second calculation unit configured to form the reference signal in relation to the current through the corresponding phase module from a mean value or instantaneous value of a phase power of a phase of the first current system or voltage system connected to the corresponding phase module, from a mean value or instantaneous value of a phase power of a phase of the second current system or voltage system connected to the corresponding phase module, from the sum of the instantaneous values or of the mean values of the phase powers of the phases of the first current system or voltage system, and from the sum of the instantaneous values or of the mean values of the phase powers of the phases of the second current system or voltage system, respectively.

BRIEF DESCRIPTION OF THE DRAWINGS

Additional refinements, advantages and features of the present disclosure are described in more detail below with reference to exemplary embodiments illustrated in the drawings, in which.

The reference numbers used in the drawing and their meanings are summarized in the reference number list. In the drawings, the same parts are essentially provided with the same reference numbers. The embodiments described serve as examples of the subject-matter of the disclosure and have no limiting effect.

DETAILED DESCRIPTION

Exemplary embodiments of the present disclosure provide a method for operating a direct converter circuit, by means of which small energy fluctuations on phase modules can be achieved. Exemplary embodiments of the present disclosure also provide a device with which the method according to the disclosure can be carried out in a particularly simple manner.

The direct converter circuit includes at least two phase modules and serves to connect phases of a first current system or voltage system to phases of a second current system or voltage system. Furthermore, each phase module includes a plurality of two-pole switching cells connected in series with one another, and each switching cell has controllable two-way power semiconductor switches with a controlled one-way current-carrying direction and a capacitive energy store. According to the method, the power semiconductor switches of the switching cells of the associated phase module are controlled by means of a control signal. According to the an exemplary embodiment of the present disclosure, each phase module has an inductor in series with the series circuit of the switching cells and, for each phase module, the control signal is formed from the difference between a reference signal in relation to the voltage over the phase module and a voltage signal over the inductor. The voltage signal over the inductor is formed from a reference signal in relation to the current through the phase module. The reference signal in relation to the current through the phase module is in turn formed from a mean value or instantaneous value of a phase power of a phase of the first current system or voltage system connected to the phase module, from a mean value or instantaneous value of a phase power of a phase of the second current system or voltage system connected to the phase module, from the sum of the instantaneous values or of the mean values of the phase powers of the phases of the first current system or voltage system and from the sum of the instantaneous values or of the mean values of the phase powers of the phases of the second power or voltage system.

Due to the mean value or instantaneous value of the phase power of the phase of the first current system or voltage system connected to the phase module, the mean value or instantaneous value of the phase power of the phase of the second current system or voltage system connected to the phase module, the sum of the instantaneous values or of the mean values of the phase powers of the phases of the first current system or voltage system and the sum of the instantaneous values or of the mean values of the phase powers of the phases of the second current system or voltage system is ultimately incorporated into the formation of the control signal, a distribution of all phase currents and currents of the capacitive energy store among the phase modules can advantageously be achieved, so that a low amplitude of the energy fluctuations on phase modules can be achieved, as a result of which a reliable and stable operation of the direct converter circuit can be achieved and the capacitive energy stores of the switching cells can be dimensioned as small and are therefore space-saving and economical.

The device according to the present disclosure for carrying out the method for operating the direct converter circuit includes a control circuit for each phase module serving to generate the control signal. The control circuit is connected to the power semiconductor switches of the switching cells of the phase module. In relation to each phase module, the difference between the reference signal in relation to the voltage over the phase module and the voltage signal over the inductor is fed to the control circuit to form the control signal. Furthermore, a common first calculation unit for the formation of the voltage signal over the inductor from the reference signal in relation to the current through the phase module is provided for all phase modules. In addition, a common second calculation unit is provided for all phase modules for the formation of the reference signal in relation to the current through the phase module from the mean value or instantaneous value of the phase power of the phase of the first current system or voltage system connected to the phase module, from the mean value or instantaneous value of the phase power of the phase of the second current system or voltage system connected to the phase module, from the sum of the instantaneous values or of the mean values of the phase powers of the phases of the first current system or voltage system and from the sum of the instantaneous values or of the mean values of the phase powers of the phases of the second current system or voltage system.

The device according to the present disclosure for carrying out the method for operating the direct converter circuit can therefore be implemented very simply and economically, as the circuit cost can be kept extremely low and furthermore only a small number of components are required for its setup. The method according to the present disclosure can thus be carried out in a particularly simple manner by means of this device.

Figure 1:
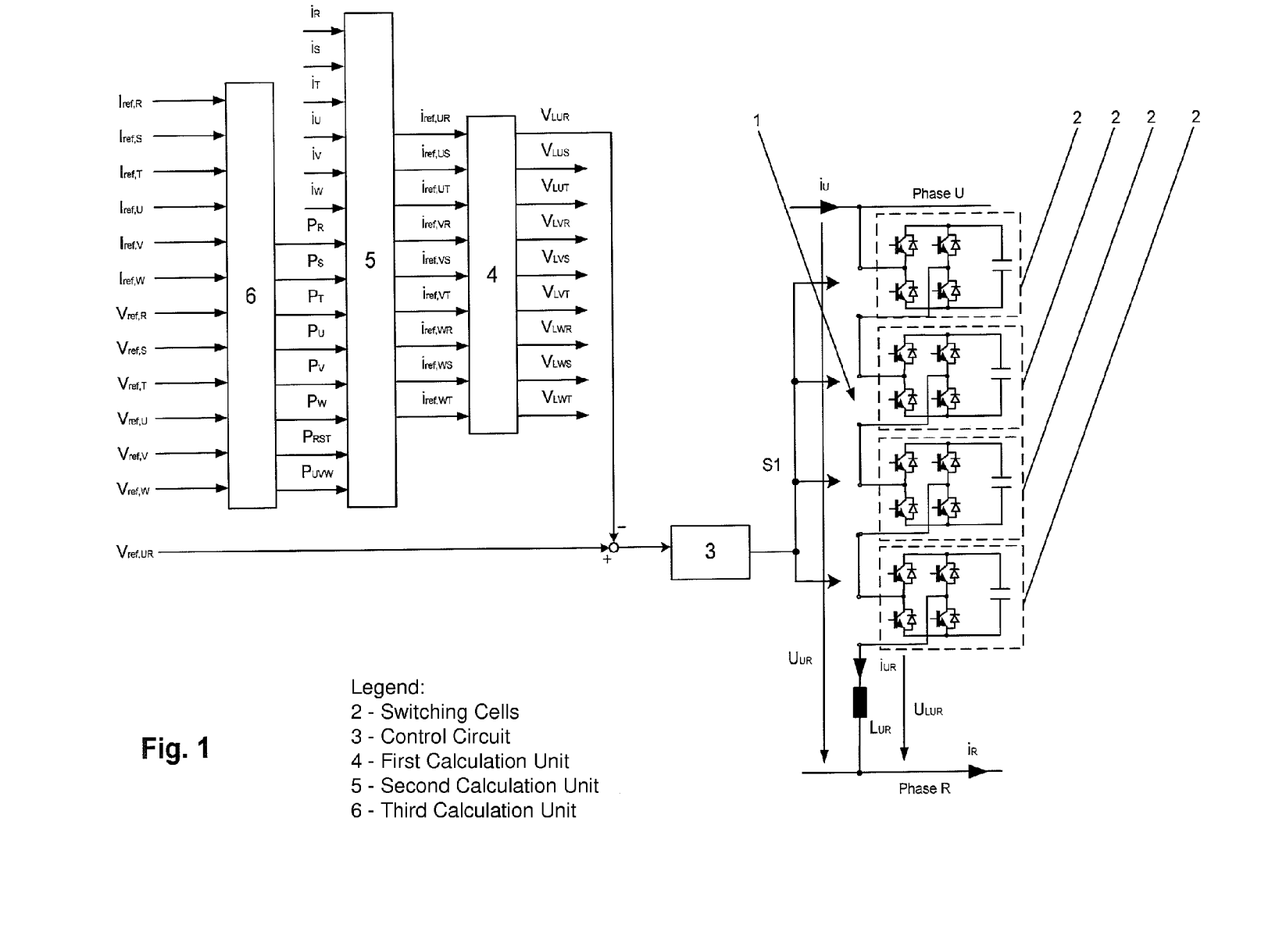
FIG. 1 shows an exemplary embodiment of a device according to the present disclosure to carry out the method according to the present disclosure for operating a direct converter circuit.
Figure 2:
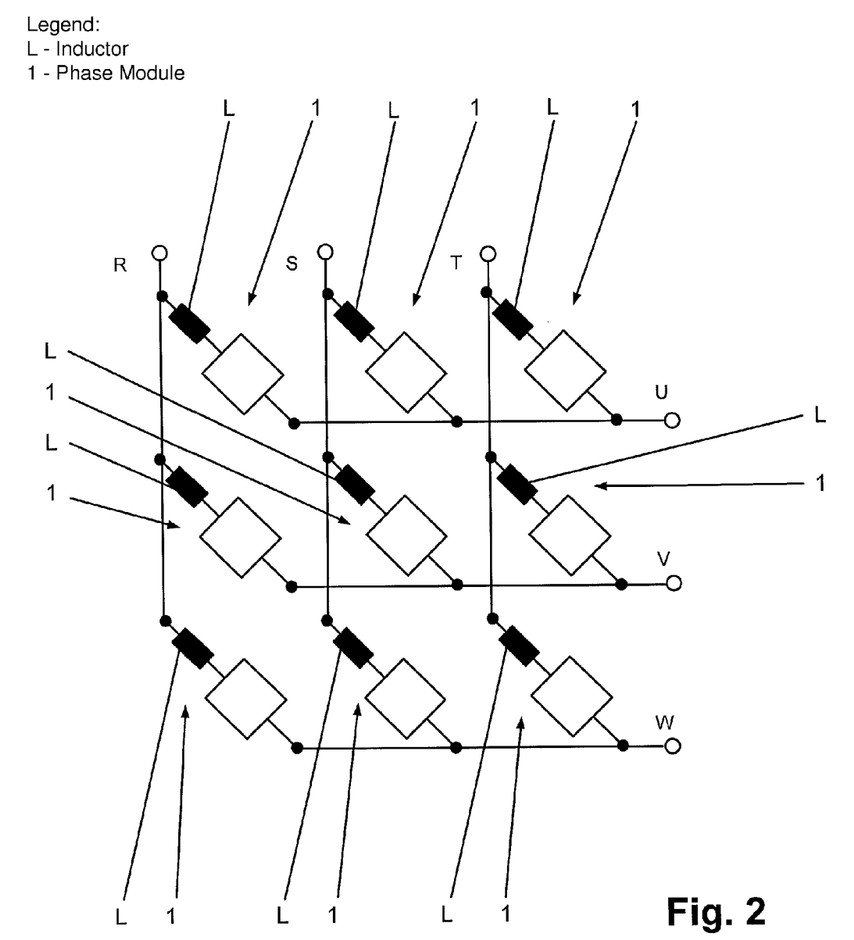
FIG. 2 shows an exemplary embodiment of a direct converter according to the present disclosure.

FIG. 1 shows an exemplary embodiment of a device according to the present disclosure to carry out the method according to the present disclosure for the operation of a direct converter circuit. It is to be noted that only one phase module 1 of the direct converter circuit is shown in FIG. 1 for the sake of clarity. The direct converter circuit according to FIG. 1 generally includes at least two phase modules 1, wherein each phase module 1 serves to connect phases U, V, W of a first current system or voltage system with phases R, S, T of a second current system or voltage system. It is assumed with regard to FIG. 1 that the first current system or voltage system has three phases U, V, W, and the second current system or voltage system similarly has three phases R, S, T, wherein any given number of phases is naturally conceivable with regard to the systems. Each phase module 1 includes a plurality of two-pole switching cells 2 connected in series with one another, wherein each switching cell 2 has controllable two-way power semiconductor switches with a controlled one-way current-carrying direction and a capacitive energy store. The respective controllable power semiconductor switch may be designed, for example, as a turn-off thyristor (GTO—Gate Turn-Off Thyristor) or as an integrated thyristor with a commutated control electrode (IGCT—Integrated Gate Commutated Thyristor) in each case with an antiparallel-switched diode. However, it is also conceivable to design a controllable power semiconductor switch, for example, as a power MOSFET with an additionally antiparallel-connected diode or as a bipolar transistor with a gate electrode (IGBT) disposed in isolation with an additionally antiparallel-connected diode. FIG. 2 shows an exemplary embodiment of a direct converter with the phase modules described above.

According to an exemplary embodiment of the present disclosure, the power semiconductor switches of the switching cells 2 are controlled by means of a control signal S1 for each phase module 1. The control signal S1 may be temporarily offset for each switching cell 2, so that each switching cell 2 can advantageously be controlled in a temporarily offset manner. According to an exemplary embodiment of the present disclosure, each phase module 1 has an inductor $L_{UR}$, $L_{US}$, $L_{UT}$; $L_{VR}$, $L_{VS}$, $L_{VT}$; $L_{WR}$, $L_{WS}$, $L_{WT}$ in series with the series circuit of the switching cells, respectively, and, for each phase module 1, the control signal S1 is formed for each phase module 1 from the difference between a reference signal $V_{ref,UR}$, $V_{ref,US}$, $V_{ref,UT}$, $V_{ref,VR}$, $V_{ref,VS}$, $V_{ref,VT}$, $V_{ref,WR}$, $V_{ref,WS}$, $V_{ref,WT}$ in relation to the voltage $U_{UR}$, $U_{US}$, $U_{UT}$; $U_{VR}$, $U_{VS}$, $U_{VT}$; $U_{WR}$, $U_{WS}$, $U_{WT}$ over the phase module 1 and a voltage signal $V_{LUR}$, $V_{LUS}$, $V_{LUT}$, $V_{LVR}$, $V_{LVS}$, $V_{LVT}$, $V_{LWR}$, $V_{LWS}$, $V_{LWT}$ over the inductor $L_{UR}$, $L_{US}$, $L_{UT}$; $L_{VR}$, $L_{VS}$, $L_{VT}$; $L_{WR}$, $L_{WS}$, $L_{WT}$, respectively. The voltage signal $V_{LUR}$, $V_{LUS}$, $V_{LUT}$, $V_{LVR}$, $V_{LVS}$, $V_{LVT}$, $V_{LWR}$, $V_{LWS}$, $V_{LWT}$ over the inductor $L_{UR}$, $L_{US}$, $L_{UT}$; $L_{VR}$, $L_{VS}$, $L_{VT}$; $L_{WR}$, $L_{WS}$, $L_{WT}$ is formed from a reference signal $i_{ref,UR}$, $i_{ref,US}$, $i_{ref,UT}$, $i_{ref,VR}$, $i_{ref,VS}$, $i_{ref,VT}$, $i_{ref,WR}$, $i_{ref,WS}$, $i_{ref,WT}$ in relation to the current $i_{UR}$, $i_{US}$, $i_{UT}$; $i_{VR}$, $i_{VS}$, $i_{VT}$; $i_{WR}$, $i_{WS}$, $i_{WT}$ through the phase module 1, respectively. The reference signal $V_{ref,UR}$, $V_{ref,US}$, $V_{ref,UT}$, $V_{ref,VR}$, $V_{ref,VS}$, $V_{ref,VT}$, $V_{ref,WR}$, $V_{ref,WS}$, $V_{ref,WT}$ in relation to the voltage $U_{UR}$, $U_{US}$, $U_{UT}$; $U_{VR}$, $U_{VS}$, $U_{VT}$; $U_{WR}$, $U_{WS}$, $U_{WT}$ over the phase module 1 may be generated by a higher-order current regulator for the phase currents of the phases U, V, W of the first current system or voltage system and by a higher-order current regulator for the phase currents of the phases R, S, T of the second current system or voltage system. Furthermore, the reference signal $i_{ref,UR}$, $i_{ref,US}$, $i_{ref,UT}$, $i_{ref,VR}$, $i_{ref,VS}$, $i_{ref,VT}$, $i_{ref,WR}$, $i_{ref,WS}$, $i_{ref,WT}$ in relation to the current $i_{UR}$, $i_{US}$, $i_{UT}$; $i_{VR}$, $i_{VS}$, $i_{VT}$; $i_{WR}$, $i_{WS}$, $i_{WT}$ through the phase module 1 is formed from a mean value $\overline{P}_U$, $\overline{P}_V$, $\overline{P}_W$ or instantaneous value $P_U$, $P_V$, $P_W$ of a phase power of a phase U, V, W of the first current system or voltage system connected to the phase module 1, from a mean value $\overline{P}_R$, $\overline{P}_S$, $\overline{P}_T$ or instantaneous value $P_R$, $P_S$, $P_T$ of a phase power of a phase R, S, T of the second current system or voltage system connected to the phase module 1, from the sum of the instantaneous values $P_{UVW}$ or of the mean values $P_{UVWM}$ of the phase powers of the phases U, V, W of the first current system or voltage system and from the sum of the instantaneous values $P_{RST}$ or of the mean values $P_{RSTM}$ of the phase powers of the phases R, S, T of the second current system or voltage system.

Due to the mean value $\overline{P}_U$, $\overline{P}_V$, $\overline{P}_W$ or instantaneous value $P_U$, $P_V$, $P_W$ of the phase power of the phase U, V, W of the first current system or voltage system connected to the phase module 1, the mean value $\overline{P}_R$, $\overline{P}_S$, $\overline{P}_T$ or instantaneous value $P_R$, $P_S$, $P_T$ of the phase power of the phase R, S, T of the second current system or voltage system connected to the phase module 1, the sum of the instantaneous values $P_{UVW}$ or of the mean values $P_{UVWM}$ of the phase powers of the phases U, V, W of the first current system or voltage system and the sum of the instantaneous values $P_{RST}$ or of the mean values $P_{RSTM}$ of the phase powers of the phases R, S, T of the second current system or voltage system is ultimately incorporated into the formation of the control signal S1, a distribution of all phase currents and currents of the capacitive energy store among the phase modules 1 can advantageously be achieved, so that a required low amplitude of the energy fluctuations on phase modules 1 can be achieved, as a result of which a reliable and stable operation of the direct converter circuit can be achieved and the capacitive energy stores of the switching cells 2 can be dimensioned as small and are therefore space-saving and economical.

The following formula is generally used to form the voltage signal $V_{LXY}$ over the inductor $L_{XY}$ of the associated phase module 1:

$$V_{LXY} = L_{XY} \cdot \frac{d}{dt} i_{ref,XY}, \qquad [1]$$

where the index XY generally indicates the connection of a phase X of the first current system or voltage system to a phase Y of the second current system or voltage system. Alternatively, the voltage signal $V_{LXY}$ over the inductor $L_{XY}$ of the associated phase module 1 can also be formed, for example, by a feedback:

$$V_{LXY} = K(i_{ref,XY} - i_{XY}) \qquad [1a],$$

where K is a selectable factor.

According to the exemplary embodiment illustrated in FIG. 1, the power semiconductor switches of each switching cell 2 are connected in the manner of a bridge circuit, wherein the capacitive energy store is connected in parallel with the bridge circuit. Alternatively, however, it would also be conceivable to connect the power semiconductor switches of each switching cell 2 in the manner of a half-bridge circuit, wherein the capacitive energy store is then connected in parallel with the half-bridge circuit.

For each phase module 1, the reference signal $i_{ref,UR}$, $i_{ref,US}$, $i_{ref,UT}$, $i_{ref,VR}$, $i_{ref,VS}$, $i_{ref,VT}$, $i_{ref,WR}$, $i_{ref,WS}$, $i_{ref,WT}$ in relation to the current $i_{UR}$, $i_{US}$, $i_{UT}$; $i_{VR}$, $i_{VS}$, $i_{VT}$; $i_{WR}$, $i_{WS}$, $i_{WT}$ through the phase module 1 is additionally formed from a phase current $i_U$, $i_V$, $i_W$ of the phase U, V, W of the first current system or voltage system connected to the phase module 1 and from a phase current $i_R$, $i_S$, $i_T$ of the phase R, S, T of the second current system or voltage system connected to the phase module 1.

The reference signal $i_{ref,XY}$ in relation to the current $i_{XY}$ through the phase module 1 is therefore generally formed by the following formula:

$$i_{ref,XY} = \frac{\overline{P}_X}{P_{1M}} \cdot i_Y + \frac{\overline{P}_Y}{P_{2M}} \cdot i_X, \quad [2a]$$

where generally the index X is a phase of the first current system or voltage system, the index Y is a phase of the second current system or voltage system, $\overline{P}_X$, $\overline{P}_Y$ are the mean values of the phase powers $P_X$, $P_Y$ and $P_{1M}$ is the sum of the mean values of the phase powers of the first current system or voltage system, and $P_{2M}$ is the sum of the mean values of the phase powers of the second current system or voltage system.

Alternatively, it is also conceivable that the reference signal $i_{ref,XY}$ in relation to the current $i_{XY}$ through the phase module 1 is formed by the following formula:

$$i_{ref,XY} = \frac{P_X}{P_1} \cdot i_Y + \frac{P_Y}{P_2} \cdot i_X, \quad [2b]$$

where generally the index X is again a phase of the first current system or voltage system, the index Y is a phase of the second current system or voltage system, $P_X$, $P_Y$ are the instantaneous values of the phase powers and $P_1$ is the sum of the instantaneous values of the phase powers of the first current system or voltage system, and $P_2$ is the sum of the mean values of the phase powers of the second current system or voltage system.

The respective phase current $i_U$, $i_V$, $i_W$ of the phase U, V, W of the first current system or voltage system connected to the phase module 1 and the respective phase current $i_R$, $i_S$, $i_T$ of the phase R, S, T of the second current system or voltage system connected to the phase module 1 may be an instantaneous value, which is determined, for example, through measurement.

For each phase module 1, the instantaneous value of the phase power $P_U$, $P_V$, $P_W$ of the phase U, V, W of the first current system or voltage system connected to the phase module 1 is formed, for example, from a reference signal $I_{ref,U}$, $I_{ref,V}$, $I_{ref,W}$ in relation to the phase current $i_U$, $i_V$, $i_W$ of the phase U, V, W of the first current system or voltage system and from a reference signal $V_{ref,U}$, $V_{ref,V}$, $V_{ref,W}$ in relation to a phase voltage $u_U$, $u_V$, $u_W$ of the phase U, V, W of the first current system or voltage system connected to the phase module 1. Alternatively, however, it is also conceivable that the instantaneous value of the phase power $P_U$, $P_V$, $P_W$ of the phase U, V, W of the first current system or voltage system connected to the phase module 1 is formed, for example, from the phase current $i_U$, $i_V$, $i_W$, for example from a measurement value, of the phase U, V, W of the first current system or voltage system connected to the phase module 1 and from a phase voltage $u_U$, $u_V$, $u_W$, for example from a measurement value, of the phase U, V, W of the first current system or voltage system connected to the phase module 1.

In addition, the instantaneous value of the phase power $P_R$, $P_S$, $P_T$ of the phase R, S, T of the second current system or voltage system connected to the phase module 1 is formed, for example, from a reference signal $I_{ref,R}$, $I_{ref,S}$, $I_{ref,T}$ in relation to the phase current $i_R$, $i_S$, $i_T$ of the phase R, S, T of the second current system or voltage system connected to the phase module 1 and from a reference signal $V_{ref,R}$, $V_{ref,S}$, $V_{ref,T}$ in relation to a phase voltage $U_R$, $U_S$, $U_T$ of the phase R, S, T of the second current system or voltage system connected to the phase module 1. Alternatively, it is also conceivable that the instantaneous value of the phase power $P_R$, $P_S$, $P_T$ of the phase R, S, T of the second current system or voltage system connected to the phase module 1 is formed, for example, from the phase current $i_R$, $i_S$, $i_T$, for example from a measurement value, of the phase R, S, T of the second current system or voltage system connected to the phase module 1 and from a phase voltage $u_R$, $u_S$, $u_T$, for example from a measurement value, of the phase R, S, T of the second current system or voltage system connected to the phase module 1.

The respective instantaneous value of the phase power $P_U$, $P_V$, $P_W$ of the phase U, V, W of the first current system or voltage system connected to the phase module 1 and the respective instantaneous value of the phase power $P_R$, $P_S$, $P_T$ of the phase R, S, T of the second current system or voltage system connected to the phase module 1 is calculated in particular according to formula [3a]:

$$P_X = V_{ref,X} I_{ref,X}$$

$$P_Y = V_{ref,Y} I_{ref,Y} \quad [3a],$$

where again generally the index X is a phase of the first current system or voltage system, and the index Y is a phase of the second current system or voltage system.

The reference signal $I_{ref,U}$, $I_{ref,V}$, $I_{ref,W}$ in relation to the phase current $i_U$, $i_V$, $i_W$ of the phase U, V, W of the first current system or voltage system connected to the phase module 1 or generally $I_{ref,X}$, the reference signal $V_{ref,U}$, $V_{ref,V}$, $V_{ref,W}$ in relation to the phase voltage $u_U$, $u_V$, $u_W$ of the phase U, V, W of the first current system or voltage system connected to the phase module 1 or generally $V_{ref,X}$, the reference signal $I_{ref,R}$, $I_{ref,S}$, $I_{ref,T}$ in relation to the phase current $i_R$, $i_R$, $i_T$ of the phase R, S, T of the second current system or voltage system connected to the phase module 1 or generally $I_{ref,Y}$ and the reference signal $V_{ref,R}$, $V_{ref,S}$, $V_{ref,T}$ in relation to the phase voltage $u_R$, $u_S$, $u_T$ of the phase R, S, T of the second current system or voltage system connected to the phase module 1 or generally $V_{ref,Y}$ is in each case pre-definable.

Alternatively, it is also possible that the respective instantaneous value of the phase power $P_U$, $P_V$, $P_W$ of the phase U, V, W of the first current system or voltage system connected to the phase module 1 and the respective instantaneous value of the phase power $P_R$, $P_S$, $P_T$ of the phase R, S, T of the second current system or voltage system connected to the phase module 1 is calculated from the aforementioned measurement values according to formula [3b].

$$P_X = u_X i_X$$

$$P_Y = u_Y i_Y \quad [3b],$$

where again generally the index X is a phase of the first current system or voltage system, and the index Y is a phase of the second current system or voltage system.

It should be explicitly stated that the aforementioned formation of the above-mentioned instantaneous values $P_U$, $P_V$, $P_W$, $P_R$, $P_S$, $P_T$ of the phase powers can also be effected in other ways.

According to the exemplary embodiment illustrated in FIG. 1, the device according to the disclosure for carrying out the method for operating a direct converter circuit includes a control circuit 3 for each phase module 1 serving to generate the control signal S1. The control circuit 3 is connected to the power semiconductor switches of the switching cells 2 of the phase module 1. According to an exemplary embodiment of the present disclosure, in relation to each phase module 1, the difference between the reference signal $V_{ref,UR}$, $V_{ref,US}$, $V_{ref,UT}$, $V_{ref,VR}$, $V_{ref,VS}$, $V_{ref,VT}$, $V_{ref,WR}$, $V_{ref,WS}$, $V_{ref,WT}$ in relation to the voltage $U_{UR}$, $U_{US}$, $U_{UT}$; $U_{VR}$, $U_{VS}$, $U_{VT}$; $U_{WR}$, $U_{WS}$, $U_{WT}$ over the phase module 1 and a voltage signal $V_{LUR}$, $V_{LUS}$, $V_{LUT}$, $V_{LVR}$, $V_{LVS}$, $V_{LVT}$, $V_{LWR}$, $V_{LWS}$, $V_{LWT}$ over the inductor $L_{UR}$, $L_{US}$, $L_{UT}$; $L_{VR}$, $L_{VS}$, $L_{VT}$; $L_{WR}$, $L_{WS}$, $L_{WT}$ is fed to the control circuit 3 to form the control signal S1, respectively. Furthermore, for all phase modules 1, a common first calculation unit 4 is provided to form the voltage signal $V_{LUR}$, $V_{LUS}$, $V_{LUT}$, $V_{LVR}$, $V_{LVS}$, $V_{LVT}$, $V_{LWR}$, $V_{LWS}$, $V_{LWT}$ over the inductor $L_{UR}$, $L_{US}$, $L_{UT}$; $L_{VR}$, $L_{VS}$, $L_{VT}$; $L_{WR}$, $L_{WS}$, $L_{WT}$, in particular according to formula [1], from the reference signal $i_{ref,UR}$, $i_{ref,US}$, $i_{ref,UT}$, $i_{ref,VR}$, $I_{ref,VS}$, $i_{ref,VT}$, $i_{ref,WR}$, $i_{ref,WS}$, $i_{ref,WT}$ in relation to the current $i_{UR}$, $i_{US}$, $i_{UT}$; $i_{VR}$, $i_{VS}$, $i_{VT}$; $i_{WR}$, $i_{WS}$, $i_{WT}$ through the phase module 1, respectively. Furthermore, a common second calculation unit 5 is provided for all phase modules 1 to form the reference signal $i_{ref,UR}$, $i_{ref,US}$, $i_{ref,UT}$, $i_{ref,VR}$, $i_{ref,VS}$, $i_{ref,VT}$, $i_{ref,WR}$, $i_{ref,WS}$, $i_{ref,WT}$ in relation to the current $i_{UR}$, $i_{US}$, $i_{UT}$; $i_{VR}$, $i_{VS}$, $i_{VT}$; $i_{WR}$, $i_{WS}$, $i_{WT}$ through the phase module 1, in particular according to formula [2a] or [2b], from the mean value $\overline{P}_U$, $\overline{P}_V$, $\overline{P}_W$ or instantaneous value $P_U$, $P_V$, $P_W$ of the phase power of the phase U, V, W of the first current system or voltage system connected to the phase module 1, from the mean value $\overline{P}_R$, $\overline{P}_S$, $\overline{P}_T$ or instantaneous value $P_R$, $P_S$, $P_T$ of the phase power of the phase R, S, T of the second current system or voltage system connected to the phase module 1, from the sum of the instantaneous values $P_{UVW}$ or of the mean values $P_{UVWM}$ of the phase powers of the phases U, V, W of the first current system or voltage system and from the sum of the instantaneous values $P_{RST}$ or of the mean values $P_{RSTM}$ of the phase powers of the phases R, S, T of the second current system or voltage system, respectively.

The common second calculation unit 5 forms the reference signal $i_{ref,UR}$, $i_{ref,US}$, $i_{ref,UT}$, $i_{ref,VR}$, $i_{ref,VS}$, $i_{ref,VT}$, $i_{ref,WR}$, $i_{ref,WS}$, $i_{ref,WT}$ in relation to the current $i_{UR}$, $i_{US}$, $i_{UT}$; $i_{VR}$, $i_{VS}$, $i_{VT}$; $i_{WR}$, $i_{WS}$, $i_{WT}$ through the phase module 1, in particular according to formula [2a] or [2b], additionally from the phase current $i_U$, $i_V$, $i_W$ of the phase U, V, W of the first current system or voltage system connected to the phase module 1 and from the phase current $i_R$, $i_S$, $i_T$ of the phase R, S, T of the second current system or voltage connected to the phase module 1.

In addition, a common third calculation unit 6 is provided for all phase modules 1 to form the instantaneous value of the phase power $P_U$, $P_V$, $P_W$ of the phase U, V, W of the first current system or voltage system connected to the phase module 1, in particular according to formula [3a], from the reference signal $I_{ref,U}$, $I_{ref,V}$, $I_{ref,W}$ in relation to the phase current $i_U$, $i_V$, $i_W$ of the phase U, V, W of the first current system or voltage system connected to the phase module 1 and from the reference signal $V_{ref,U}$, $V_{ref,V}$, $V_{ref,W}$ in relation to the phase voltage $u_U$, $u_V$, $u_W$ of the phase U, V, W of the first current system or voltage system connected to the phase module 1 and to form the instantaneous value of the phase power $P_R$, $P_S$, $P_T$ of the phase R, S, T of the second current system or voltage system connected to the phase module 1, in particular according to formula [3a], from the reference signal $I_{ref,R}$, $I_{ref,S}$, $I_{ref,T}$ in relation to the phase current $i_R$, $i_R$, $i_T$ of the phase R, S, T of the second current system or voltage system connected to the phase module 1 and from a reference signal $V_{ref,R}$, $V_{ref,S}$, $V_{ref,T}$ in relation to the phase voltage $u_R$, $u_S$, $u_T$ of the phase R, S, T of the second current system or voltage system connected to the phase module 1, respectively.

Alternatively, a common third calculation unit 6 is provided for all phase modules 1 to form the instantaneous value of the phase power $P_U$, $P_V$, $P_W$ of the phase U, V, W of the first current system or voltage system connected to the phase module 1, in particular according to formula [3b], from the phase current $i_U$, $i_V$, $i_W$ of the phase U, V, W of the first current system or voltage system connected to the phase module 1 and from the phase voltage $u_U$, $u_V$, $u_W$ of the phase U, V, W of the first current system or voltage system connected to the phase module 1 and to form the instantaneous value of the phase power $P_R$, $P_S$, $P_T$ of the phase R, S, T of the second current system or voltage system connected to the phase module 1, in particular according to formula [3b], from the phase current $i_R$, $i_S$, $i_T$ of the phase R, S, T of the second current system or voltage system connected to the phase module 1 and from a phase voltage $u_R$, $u_S$, $u_T$ of the phase R, S, T of the second current system or voltage system connected to the phase module 1.

In total, it has been possible to show that the exemplary devices according to the disclosure, for example, according to FIG. 1, to carry out the method according to the disclosure for operating the direct converter circuit can be implemented very simply and economically, since the circuit outlay is extremely low and furthermore only a small number of components are required for the set-up. The method according to the disclosure can therefore be particularly simply carried out with these devices.

REFERENCE NUMBER LIST

1 Phase module
2 Switching cell
3 Control circuit
4 first calculation unit
5 second calculation unit
6 third calculation unit

What is claimed is:
1. A method for operating a direct converter circuit, wherein the direct converter circuit includes at least two phase modules and is configured to connect phases of a first current system or voltage system with phases of a second current system or voltage system, each phase module respectively including a plurality of two-pole switching cells connected in series with one another, each phase module including an inductor respectively in series with the series circuit of the corresponding switching cells, and each switching cell including controllable two-way power semiconductor switches with a controlled one-way current-carrying direction and a capacitive energy store, the method comprising:
  controlling the power semiconductor switches of the switching cells of the associated phase module by means of a control signal;
  for each phase module, forming the control signal from the difference between a reference signal in relation to a voltage over the phase module and a voltage signal over the inductor, respectively;
  forming the voltage signal over the inductor from a reference signal in relation to the current through the corresponding phase module, respectively; and forming the reference signal in relation to the current through the corresponding phase module from a mean value or instantaneous value of a phase power of a phase of the first current system or voltage system connected to the phase module, from a mean value or instantaneous value of a phase power of a phase of the second current system or voltage system connected to the corresponding phase module, from the sum of the instantaneous values or of the mean values of the phase powers of the phases of the first current system or voltage system, and from the sum of the instantaneous values or of the mean values of the phase powers of the phases of the second current system or voltage system, respectively.

2. The method as claimed in claim 1, wherein, for each phase module, the reference signal in relation to the current through the phase module is additionally formed from a phase current of the phase of the first current system or voltage system connected to the phase module and from a phase current of the phase of the second current system or voltage system connected to the phase module, respectively.

3. The method as claimed in claim 2, wherein, for each phase module, the instantaneous value of the phase power of the phase of the first current system or voltage system connected to the corresponding phase module is formed from a reference signal in relation to the phase current of the phase of the first current system or voltage system connected to the phase module and from a reference signal in relation to a phase voltage of the phase of the first current system or voltage system connected to the phase module, respectively, and the instantaneous value of the phase power of the phase of the second current system or voltage system connected to the phase module is formed from a reference signal in relation to the phase current of the phase of the second current system or voltage system connected to the phase module, and from a reference signal in relation to a phase voltage of the phase of the second current system or voltage system connected to the phase module, respectively.

4. The method as claimed in claim 2, wherein, for each phase module, the instantaneous value of the phase power of the phase of the first current system or voltage system connected to the corresponding phase module is formed from a phase current of the phase of the first current system or voltage system connected to the corresponding phase module and from a phase voltage of the phase of the first current system or voltage system connected to the phase module, respectively, and the instantaneous value of the phase power of the phase of the second current system or voltage system connected to the corresponding phase module is formed from a phase current of the phase of the second current system or voltage system connected to the corresponding phase module and from a phase voltage of the phase of the second current system or voltage system connected to the phase module.

5. A device for operating a direct converter circuit, wherein the direct converter circuit includes at least two phase modules and is configured to connect phases of a first current system or voltage system with phases of a second current system or voltage system, each phase module respectively including a plurality of two-pole switching cells connected in series with one another, each phase module respectively including an inductor in series with the series circuit of the switching cells, and each switching cell including controllable two-way power semiconductor switches with a controlled one-way current-carrying direction and a capacitive energy store, the device comprising:

a control circuit for each phase module configured to generate a control signal, the control circuit being connected to the power semiconductor switches of the switching cells of the corresponding phase module, respectively, wherein, in relation to each phase module, the difference between a reference signal in relation to the voltage over the corresponding phase module and a voltage signal over the inductor is fed to the control circuit to form the control signal, respectively;

a common first calculation unit configured to, for each phase module, form the voltage signal over the inductor from a reference signal in relation to the current through the corresponding phase module, respectively; and a common second calculation unit configured to, for each phase module, form the reference signal in relation to the current through the corresponding phase module from a mean value or instantaneous value of a phase power of a phase of the first current system or voltage system connected to the corresponding phase module, from a mean value or instantaneous value of a phase power of a phase of the second current system or voltage system connected to the corresponding phase module, from the sum of the instantaneous values or of the mean values of the phase powers of the phases of the first current system or voltage system, and from the sum of the instantaneous values or of the mean values of the phase powers of the phases of the second current system or voltage system, respectively.

6. The device as claimed in claim 5, wherein the common second calculation unit is configured to form the reference signal in relation to the current through the corresponding phase module, from a phase current of the phase of the first current system or voltage system connected to the corresponding phase module, and from a phase current of the phase of the second current system or voltage system connected to the corresponding phase module, respectively.

7. The device as claimed in claim 6, wherein, for all phase modules, the device comprises a common third calculation unit configured to form the instantaneous value of the phase power of the phase of the first current system or voltage system connected to the corresponding phase module from a reference signal in relation to the phase current of the phase of the first current system or voltage system connected to the corresponding phase module and from a reference signal in relation to a phase voltage of the phase of the first current system or voltage system connected to the corresponding phase module, respectively, and form the instantaneous value of the phase power of the phase of the second current system or voltage system connected to the corresponding phase module from a reference signal in relation to the phase current of the phase of the second current system or voltage system connected to the corresponding phase module and from a reference signal in relation to a phase voltage of the phase of the second current system or voltage system connected to the corresponding phase module, respectively.

8. The device as claimed in claim 6, wherein, for all phase modules, the device comprises a common third calculation unit configured to form the instantaneous value of the phase power of the phase of the first current system or voltage system connected to the corresponding phase module from a phase current of the phase of the first current system or voltage system and from a phase voltage of the phase of the first current system or voltage system connected to the corresponding phase module, respectively, and form the instantaneous value of the phase power of the phase of the second current system or voltage system connected to the corresponding phase module from a phase current of the phase of the second current system or voltage system connected to the corresponding phase module and from a phase voltage of the phase of the second current system or voltage system connected to the corresponding phase module, respectively.

9. A device for operating a direct converter circuit, wherein the direct converter circuit includes at least two phase modules and is configured to connect phases of a first current system or voltage system with phases of a second current system or voltage system, each phase module respectively including a plurality of two-pole switching cells connected in series with one another, each phase module respectively including an inductor in series with the series circuit of the switching cells, and each switching cell including controllable two-way power semiconductor switches with a controlled one-way current-carrying direction and a capacitive energy store, the device comprising:

control means for generating a control signal for each phase module, the control means being connected to the power semiconductor switches of the switching cells of the corresponding phase module, respectively, wherein, in relation to each phase module, the difference between a reference signal in relation to the voltage over the corresponding phase module and a voltage signal over the inductor is fed to the control means to form the control signal, respectively;

first calculation means for commonly forming, for each phase module, the voltage signal over the inductor from a reference signal in relation to the current through the corresponding phase module, respectively; and second calculation means for commonly forming, for each phase module, the reference signal in relation to the current through the corresponding phase module from a mean value or instantaneous value of a phase power of a phase of the first current system or voltage system connected to the corresponding phase module, from a mean value or instantaneous value of a phase power of a phase of the second current system or voltage system connected to the corresponding phase module, from the sum of the instantaneous values or of the mean values of the phase powers of the phases of the first current system or voltage system, and from the sum of the instantaneous values or of the mean values of the phase powers of the phases of the second current system or voltage system, respectively.

10. The device as claimed in claim 9, wherein the second calculation means forms the reference signal in relation to the current through the corresponding phase module, from a phase current of the phase of the first current system or voltage system connected to the corresponding phase module, and from a phase current of the phase of the second current system or voltage system connected to the corresponding phase module, respectively.

11. The device as claimed in claim 10, wherein, for each phase module, the device comprises a third calculation means for, commonly for each phase module, forming the instantaneous value of the phase power of the phase of the first current system or voltage system connected to the corresponding phase module from a reference signal in relation to the phase current of the phase of the first current system or voltage system connected to the corresponding phase module and from a reference signal in relation to a phase voltage of the phase of the first current system or voltage system connected to the corresponding phase module, respectively, and forming the instantaneous value of the phase power of the phase of the second current system or voltage system connected to the corresponding phase module from a reference signal in relation to the phase current of the phase of the second current system or voltage system connected to the corresponding phase module and from a reference signal in relation to a phase voltage of the phase of the second current system or voltage system connected to the corresponding phase module, respectively.

12. The device as claimed in claim 10, wherein, for each phase module, the device comprises a third calculation means for, commonly for each for each phase module, forming the instantaneous value of the phase power of the phase of the first current system or voltage system connected to the corresponding phase module from a phase current of the phase of the first current system or voltage system and from a phase voltage of the phase of the first current system or voltage system connected to the corresponding phase module, respectively, and forming the instantaneous value of the phase power of the phase of the second current system or voltage system connected to the corresponding phase module from a phase current of the phase of the second current system or voltage system connected to the corresponding phase module and from a phase voltage of the phase of the second current system or voltage system connected to the corresponding phase module, respectively.

* * * * *